US00RE36291E

United States Patent [19]

Martin

[11] E Patent Number: Re. 36,291

[45] Reissued Date of Patent: Sep. 7, 1999

[54] REACTION PRODUCT OF NITROGEN BASES AND PHOSPHATE ESTERS AS CORROSION INHIBITORS

[75] Inventor: Richard L. Martin, Sugarland, Tex.

[73] Assignee: Baker Hughes Incorporated, Houston, Tex.

[21] Appl. No.: 08/571,041

[22] Filed: Dec. 12, 1995

Related U.S. Patent Documents

Reissue of:

[64] Patent No.: 5,380,466
Issued: Jan. 10, 1995
Appl. No.: 08/048,555
Filed: Apr. 15, 1993

U.S. Applications:

[ 63] Continuation of application No. 07/871,451, Apr. 21, 1992, abandoned.

[51] Int. Cl.[6] ..... C23F 11/167; C10G 75/02

[52] U.S. Cl. ..... 252/389.22; 252/389.21; 252/390; 252/396; 252/394; 210/700; 422/15; 422/16

[58] Field of Search ..... 252/389.21, 389.22, 252/389.23, 390, 396, 389.62, 394; 210/611, 699, 764, 700; 422/15, 16, 18

[56] References Cited

U.S. PATENT DOCUMENTS

| | | | |
|---|---|---|---|
| 2,968,629 | 1/1961 | Thompson | 252/389 |
| 3,054,750 | 9/1962 | Jolly | 507/936 |
| 3,133,787 | 5/1964 | Kelley | 21/2.7 |
| 3,620,974 | 11/1971 | Stanford et al. | 252/8.552 |
| 3,628,926 | 12/1971 | Eckert et al. | 210/764 |
| 3,836,462 | 9/1974 | Larson | 210/58 |
| 3,846,071 | 11/1974 | Redmore | 21/2.7 A |
| 3,909,447 | 9/1975 | Redmore et al. | 252/389 |
| 4,042,323 | 8/1977 | Redmore et al. | 21/2.7 |
| 4,051,029 | 9/1977 | Redmore et al. | 210/58 |
| 4,066,398 | 1/1978 | Hwa | 252/8.555 X |
| 4,169,800 | 10/1979 | Dounchis | 252/49.9 |
| 4,311,662 | 1/1982 | Bellos | 422/12 |
| 4,339,349 | 7/1982 | Martin et al. | 252/389 |
| 4,511,480 | 4/1985 | Outlaw et al. | 252/8.55 E |
| 4,584,021 | 4/1986 | Bartlett | 106/14.42 |
| 4,604,226 | 8/1986 | Bartlett | 252/389 A |
| 4,615,813 | 10/1986 | Bretz | 252/8.514 |
| 4,636,256 | 1/1987 | Valone | 106/14.15 |
| 4,722,805 | 2/1988 | Martin | 252/389.21 |
| 4,945,992 | 8/1990 | Sacco | 422/37 X |
| 5,330,662 | 7/1994 | Jahnke et al. | 252/8.551 |

FOREIGN PATENT DOCUMENTS

| | | | |
|---|---|---|---|
| 0 002 530 | of 0000 | European Pat. Off. . | |
| 0 256 802 | of 0000 | European Pat. Off. . | |
| 0 520 761 | of 0000 | European Pat. Off. . | |
| 1 180 219 | of 0000 | Germany . | |
| 1 103 713 | 9/1955 | Germany . | |
| 3526640 | 1/1987 | Germany | C23F 11/167 |
| 54 139 843 | of 0000 | Japan . | |
| 3-221597 | 9/1991 | Japan | C10M 161/00 |
| 8 901 407 | of 0000 | Netherlands . | |
| 8 901 407 | 1/1991 | Netherlands | C23F 11/167 |
| 0 847 321 | of 0000 | United Kingdom . | |
| 2 104 897 | of 0000 | United Kingdom . | |
| 2104897 | 3/1983 | United Kingdom | C07F 9/08 |
| 2146557 | 4/1985 | United Kingdom | C10M 161/00 |
| 2170509 | 8/1988 | United Kingdom | C10M 141/10 |
| 9 112 354 | of 0000 | WIPO . | |

OTHER PUBLICATIONS

European Search Report. (Jul. 1993).

*Primary Examiner*—Nancy Degen
*Assistant Examiner*—Deanna Baxan
*Attorney, Agent, or Firm*—Howell & Haferkamp, L.C.

[57] ABSTRACT

A method for inhibiting corrosion of metal surfaces in an aqueous medium, comprising incorporating into the medium a corrosion inhibitor in an amount sufficient to inhibit corrosion, the corrosion inhibitor comprising a water-soluble agent selected from the group consisting of compositions of the formula

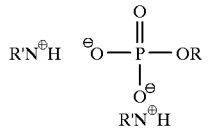

compositions of the formula

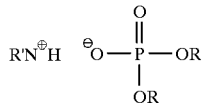

and mixtures thereof, wherein R is $R^2$–$(OCH_2CH_2)_x$, wherein $R^2$ is a substituted or unsubstituted alkyl, aryl, or aralkyl group of from about five to about fifteen carbon atoms, each carbon atom having at least one hydrogen and x is an integer of from about one to about ten, and R'N is a basic nitrogen compound that is at least water-dispersible.

41 Claims, No Drawings

REACTION PRODUCT OF NITROGEN BASES AND PHOSPHATE ESTERS AS CORROSION INHIBITORS

Matter enclosed in heavy brackets [ ] appears in the original patent but forms no part of this reissue specification; matter printed in italics indicates the additions made by reissue.

This is a continuation application of co-pending application U.S. Ser. No. 07/871,451, filed Apr. 21, 1992 now abandoned.

BACKGROUND OF THE INVENTION

1. Field of the Invention

The present invention is directed to inhibition of corrosion of ferrous metal surfaces in aqueous media and more particularly to corrosion inhibitors that are useful in such media in which protection of living organisms therein is of concern.

2. Description of the Prior Art

Corrosion of ferrous metal surfaces in aqueous media has long been a problem. This problem is especially troublesome in deep sea operations such as off-shore drilling, where corrosion inhibitors must satisfy several criteria in order to be effective in the demanding conditions encountered. A number of corrosion inhibitors have been developed in attempts to satisfy the demands imposed by such activities. But, because it is difficult to meet each of several independent corrosion inhibition conditions, these efforts have met with varying success.

Nevertheless, increasing environmental concerns have introduced even further criteria for corrosion inhibitors to satisfy. In particular, the corrosion inhibitor should be compatible with the sensitive life forms indigenous to the medium into which the inhibitor is incorporated.

For example, in North Sea operations, survival not only of fish, but also of the microorganism Skeletonema costatum is of concern. Thus, environmental constraints have been imposed on the types of compositions used in the North Sea, thereby to protect such organisms. However, commercial inhibitors have been found to be too toxic to the organism. More specifically, even a concentration of less than one part per million by weight (ppm) of conventional inhibitors has been found to be lethal to at least half of the Skeletonema costatum within 96 hours. This may be written as $EC_{50}<1$ ppm. Thus, a corrosion inhibitor having an $EC_{50}$ greater than 1 ppm, especially greater than the concentration at which the inhibitor will be employed, is desired.

In addition, it is desired that the inhibitor meet several other environmental criteria as well. For example, the inhibitor should be sufficiently biodegradable so that within 28 days after treatment, the inhibitor has *been* degraded *biochemically* at least 70% [in terms of the theoretical oxygen consumption required for complete degradation (i.e.; the biological] *compared to the theoretical chemical oxygen demand required for complete degradation* (*i.e., the biochemical* oxygen demand BOD-28≧70%).

Further, the water solubility of the inhibitor should be sufficient to avoid or minimize bioaccumulation that otherwise can result in lower life forms with fat soluble inhibitors. The fat soluble inhibitors may become more concentrated as they move up the food chain. This may be quantified by measuring the resulting concentration of inhibitor in the octanol phase and in the water phase of an n-octanol/water medium into which the inhibitor has been injected, and dividing the former by the latter. It is desired that the logarithm (base 10) of the quotient be less than 3. Stated another way, "partitioning" should be less than three.

Moreover, because evaporation of a toxic solvent (if any) would be undesirable, the solvent evaporation factor (YL) should not be greater than 3. And, because of the dangers of flammability, the flash point should be greater than 56° C.

The commercial inhibitors have not been found to meet such demanding criteria. Thus, inhibitors that not only provide satisfactory corrosion inhibition, but satisfy such environmental concerns as well, are still being sought.

SUMMARY OF THE INVENTION

Briefly, therefore, the present invention is directed to a novel method for inhibiting corrosion of metal surfaces in an aqueous medium by incorporating into the medium a corrosion inhibitor comprising a composition for the formula

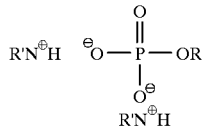

or of the formula

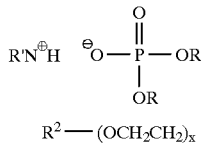

or both wherein R is $R^2$—$(OCH_2CH_2)_x$, wherein $R^2$ is an alkyl, aryl or aralkyl group of from about five to about fifteen carbon atoms, each of which carbon atoms has at least one hydrogen, and x is a positive integer up to about ten, and R'N represents a basic nitrogen compound.

Among the several advantages of the invention may be noted the provision of highly effective corrosion inhibition in aqueous media with substantially increased environmental compatibility.

DESCRIPTION OF THE PREFERRED EMBODIMENTS

In accordance with the present invention, it has been discovered that water-soluble compositions of the formula

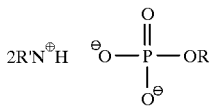

or the formula

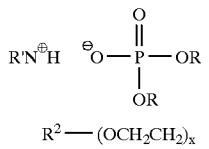

wherein R is $R^2$—$(OCH_2CH_2)_x$, wherein $R^2$ is an alkyl, aryl or aralkyl group of from about five to about fifteen carbon atoms, each of which carbon atoms has at least one hydrogen, and x is a positive integer up to about ten, and R'N represents a basic nitrogen compound that is water-soluble or water-dispersible, not only provides excellent corrosion inhibition of ferrous metals in aqueous media, but satisfies the environmental concerns involved in corrosion inhibition in off-shore oil drilling. In fact, it has been found that the noted compositions far exceed the environmental requirements and are surprisingly less toxic than the nitrogen compounds and phosphates esters from which they were derived.

Thus, it has been found that the $EC_{50}$, surprisingly, is not only greater than one ppm, but generally greater than ten ppm. This is especially significant in view of the fact that it has also been found than good corrosion inhibition has been found for an active inhibitor concentration as low as five ppm. Moreover, the BOD-28 for such compositions has been found to be well above 70%, the partitioning well below three (in fact, near zero), the solvent evaporation factor (YL) well below three (in fact, near zero), and the flash point well above 56° C.

The noted inhibitors are derived from phosphate esters. Such esters have been described in, for example, U.S. Pat. No. 4,339,349 to Martin (the present inventor) et al. In particular, the phosphate esters may be prepared by reacting an ethoxylated alcohol with polyphosphoric acid or with phosphoric anhydride. Thus, the first step may involve ethoxylating an alcohol. Generally, the alcohol is one that is biodegradable and can be made water-soluble by ethoxylation. Typically, therefore, a $C_{5-15}$ alcohol is practical. Each carbon atom of the alcohol should have at least one hydrogen to provide superior biodegradability. Accordingly, the desire for biodegradability dictates that the alcohol not have substantial branching. Preferably, the alcohol is a straight chain. Alfol 8–10 has been found to be especially suitable.

The alcohol may be ethoxylated by standard techniques. Thus, the alcohol may be heated with a base or amine catalyst to about 100° to 150° C., depending on the catalyst, and ethylene oxide added thereto. The resulting ethoxylated alcohol is of the form $R^2$—$(OCH_2CH_2)_xOH$, wherein $R^2$ is a substituted or unsubstituted alkyl, aryl or aralkyl group of from about five to about ten carbons, preferably an alkyl group, most preferably, an unsubstituted alkyl group of from about five to about ten carbons. In any event, each carbon of $R^2$ should have at least one hydrogen. The relative proportion of ethylene oxide to alcohol depends on the degree of ethoxylation desired to provide sufficient water-solubility and biodegradability. Generally, the heavier the alcohol, the greater the degree of ethoxylation required. Although any degree of ethoxylation is feasible, economic practicalities suggest that it is not desirable that more than about ten moles of ethylene oxide per mole of alcohol be used. Therefore, x is preferably from one to about ten. More preferably x is about two to about five, especially about two to about three.

A phosphate ester is then prepared from the ethoxylated alcohol. Techniques for preparation of phosphate esters are well known. See, for example, U.S. Pat. No. 4,722,805 to Martin (the present inventor), which is incorporated herein by reference. The ester may be prepared by reacting the ethoxylated alcohol with polyphosphoric acid at a temperature of from about 50° to about 75° C. The ester thus is a mono-ester taking the form

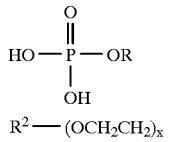

wherein R is $R^2$—$(OCH_2CH_2)_x$, $R^2$ and x having been defined above. Alternatively, the phosphate ester may be produced by a reaction of the ethoxylated alcohol with phosphoric anhydride ($P_2O_5$). However, because of the difficulty in working with phosphoric anhydride, that reaction scheme is less desired. Nevertheless, if the ester is made from phosphoric anhydride, the di-ester of the formula

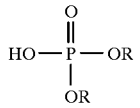

wherein R is as defined above, is formed in addition to the mono form.

The ester, whether in mono or di form, is then neutralized in an acid/base reaction with a basic nitrogen compound, preferably an amine or amine derivative. Nitrogen compounds are represented herein by the notation R'N. This notation refers to any nitrogen-containing compound and may signify, for example, morpholine, an amide, a primary, secondary or tertiary amine or even ammonia. See U.S. Pat. No. 4,722,805 for examples of suitable nitrogen compounds, which are identified therein as "nitrogen bases". The nitrogen compound should be at least water-dispersible, meaning water-dispersible or water-soluble. Preferably, the nitrogen compound is miscible with water. It is also desirable that the nitrogen be heavy enough to provide a sufficiently high flash point; e.g., more than 56° C. Optimally, the compound should also be biodegradable and nontoxic (or at least of relatively low toxicity) to humans as well as the organisms in the medium to be treated although, as noted above, it has been found that the product formed with the ester has been found to be less toxic by far than the nitrogen compound. The esters themselves are of very low toxicity.

Preferably, in the notation R'N R' may represent one or more hydrogens and one or more organic moieties, and R'N may be written in more expanded form as (I)

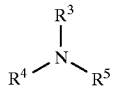

or (II)

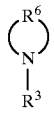

wherein $R^3$, $R^4$, $R^5$ and $R^6$ are independently selected from among hydrogen and organic moieties, any of which may contain hetero atoms, especially oxygen. Thus, $R^3$, $R^4$, and $R^5$ may be selected independently from, for example, hydrogen and substituted or unsubstituted alkyl, aryl and aralkyl groups with or without carbon replacement, and $R^6$, may be a substituted or unsubstituted alkylene, arylene or aralkylene group in which one or more of the carbons may be replaced with hetero atoms such as oxygen or nitrogen. Typically, the nitrogen compound is an amine or derivative thereof of from about three to about fifteen carbon atoms, preferably from about four to about ten carbon atoms, especially about six carbon atoms. For the higher weight compounds, it is preferable that the compound contain a hydroxyl group. Thus, superior results have been found with a morpholine by-product of the form

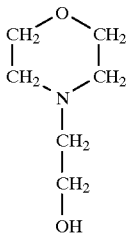

in which case $R^6$ is $—CH_2CH_2OCH_2CH_2—$ and $R^3$ is $C_2H_4OH$.

The reaction between the ester and the basic nitrogen compound R'N is a simple acid/base neutralization procedure occurring under ambient conditions with the addition of one to the other preceding slowly enough to avoid excessive production of heat. Preferably, the ester and nitrogen compound are reacted in approximately equimolar proportions, but a 2:1 molar ratio of either component to the other is acceptable. The resulting product is thus of the form

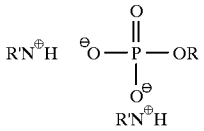

for the mono-ester and of the form

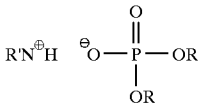

for the di-ester.

The product may then be dissolved in water and an environmentally compatible solvent such as propylene glycol (or glycerol or ethylene glycol) to reduce the viscosity and pour point. Preferably, the commercial form of the inhibitor would be about 35% by weight active. The inhibitor has been found to be effective in sour systems as well as sweet systems such as that of North Sea oil platforms. The inhibitor may be added (in its dilute form) directly to the medium to be treated, such as by pouring or injecting it into the medium. Effective concentrations have been found to be about 5 to about 100 ppm ([2–50] *2–35* ppm active), based on weight.

The invention will be further illustrated in the following examples. In the examples, all parts and percentages are by weight unless otherwise specified.

EXAMPLE 1

Kettle tests for inhibitor efficacy were conducted on a number of compositions. The tests were conducted for 24 hours, with stirring and $CO_2$ saturation at room temperature. Sweet tests were conducted with $CO_2$ sparging and sour tests with $CO_2$ sparging and 2 gm $Na_2S.9H_2O$ added at the start and the kettle sealed, giving 50 ppm $H_2S$. The following chart identifies the compositions tested.

| Composition Number | Identity |
|---|---|
| 1. | a quaternized imidazoline/acetic acid salt |
| 2. | a highly water-soluble polyimidazoline |
| 3. | a water-soluble pyridine.HCl salt |
| 4. | a not very water-soluble acetate salt of imidazoline |
| 5. | a quaternized amine |
| 6. | pentacrythritol |
| 7. | ethoxylated (2.9 moles) Alfol 8-10 phosphate ester (derived from polyphosphoric acid |
| 8. | phosphate ester, derived from $P_2O_5$ and non-ethoxylated iso-octyl alcohol |
| 9. | ethoxylated tallow amine |
| 10. | quaternary ammonium compound |
| 11. | thiourea |
| 12. | Reilly water-soluble pyridine |
| 13. | tannic acid |
| 14. | gallic acid |
| 15. | saccharin |
| 16. | lecithin |
| 17. | molasses, polyphosphoric acid |
| 18. | KI and acetic acid |
| 19. | Betaine equivalent (40% active) |

The next chart identifies compositions within the scope of this invention in terms of the nitrogen compound and phosphate ester employed:

| Composition Number | Nitrogen Compound | Ester |
|---|---|---|
| 20. | ethoxylated tallow amine | Composition No. 7 |
| 21. | hydroxyethylmorpholine | Composition No. 7 |
| 22. | crude triethanol amine | Composition No. 7 |
| 23. | Tretamine #2 | Composition No. 7 |
| 24. | ethoxylated tallow amine | Composition No. 7 |

Each of Composition Nos. 20–23 are in the presence of two moles of water per mole of nitrogen compound. Composition No. 20 is in the presence of one mole isopropyl alcohol per two moles nitrogen compound. Composition No. 24 is in the presence of one mole of iso-propyl alcohol per 2.5 moles nitrogen compound. For Composition Nos. 20–23, the nitrogen compound and ester are in equimolar proportions and for Composition No. 24, the molar ratio of the amine to the ester is 5:3.

The following results were obtained, where MPY refers to mils per year:

| Composition Number | Active Concentration (ppm) | Sweet (MPY) | Sour (MPY) |
|---|---|---|---|
| None | — | 40 | 45 |
| 1. | 90 | 6.3 | 2.4 |
| 2. | 75 | 14 | 7.2 |
| 3. | 100 | 14 | 4.6 |

-continued

| Composition Number | Active Concentration (ppm) | Sweet (MPY) | Sour (MPY) |
|---|---|---|---|
| 4. | 100 | 12 | 3.4 |
| 5. | 100 | 21 | 6.1 |
| 6. | 150 | 27 | 23 |
| 7. | 200 | 21 | 11 |
| 8. | 250 | 8.8 | 22 |
| 9. | 200 | 18 | 4.7 |
| 10. | 250 | 15 | 6.9 |
| 11. | 250 | 28 | 24 |
| 12. | 250 | 5.8 | 3.9 |
| 13. | 250 | 42 | 15 |
| 14. | 250 | 61 | 12 |
| 15. | 250 | 49 | 59 |
| 16. | 250 | 16 | 6.4 |
| 17. | 150 | 45 | 6.8 |
| 18. | 150 | 59 | 23 |
| 19. | 100 | 12 | 3.4 |
| 20. | 90 | 8.2 | 3.1 |
| 21. | 125 | 8.1 | 2.2 |
| 21. | 23 | 9.8 | 3.1 |
| 21. | 60 | 10 | 5.9 |
| 21. | 120 | 7 | 4.1 |
| 21. | 460 | 6.7 | 1.3 |
| 22. | 125 | 8.5 | 7.2 |
| 23. | 125 | 8.5 | 6.4 |
| 24. | 125 | 7.7 | 4.6 |

EXAMPLE 2

Various physical properties were measured according to standard procedures for Composition No. 21 and, as a comparison, Composition No. 1, which has been employed commercially in North Sea production. The following results were obtained:

| | Composition No. 1 | Composition No. 21 |
|---|---|---|
| Toxicity | $EC_{50}$ = 0.18 ppm | $EC_{50}$ > 10 ppm |
| BOD | 11 days 30% | 11 days 64%<br>15 days > 70% |
| Partitioning | ~2 | Near 0 |
| YL (OAR Group) | 2 | Near 00 |
| Flash point | 27° C. | >93° C. |

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method for inhibiting corrosion of ferrous metal surfaces in an aqueous medium [containing] *contacting or to contact* at least one of living Skeletonema costatum or living fish, the method comprising incorporating into the medium a corrosion inhibitor in an amount sufficient to inhibit corrosion of ferrous metal surfaces in the medium, the corrosion inhibitor [having a BOD-28 of at least about 70% in the medium] *having an $EC_{50}$ for Skeletonema costatum of at least about 1 ppm by weight* and comprising a water-soluble agent selected from the group consisting of compositions of the formula

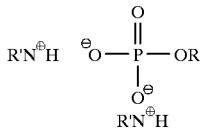

compositions of the formula

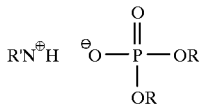

and mixtures thereof, wherein R is [$R^2$—$OCH_2CH_2$—$_x$]$R^2$-~~$(OCH_2CH_2)_x$~~, wherein $R^2$ is an alkyl, aryl, or aralkyl group of from about five to about fifteen carbon atoms, each carbon atom having at least one hydrogen and x is an integer of from one to about ten, and R'N is a basic nitrogen compound that is at least water-dispersible.

2. A method as set forth in claim 1 wherein the agent is a composition of the formula

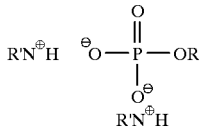

wherein R and R'N are defined in claim 1.

3. A method as set forth in claim 2 wherein $R^2$ is an unsubstituted alkyl group.

4. A method as set forth in claim 3 wherein the basic nitrogen compound is a compound of the formula

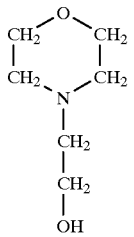

5. A method as set forth in claim 3 wherein x is from about two to about five.

[6. A method as set forth in claim 1 wherein the corrosion inhibitor has an $EC_{50}$ for Skeletonema costatum of at least about 1 ppm by weight.]

7. A method as set forth in claim [6] *1* wherein the corrosion inhibitor further has a partitioning less than about three, a YL of, at most, about three and a flash point greater than about 56° C.

8. A method as set forth in claim 1 wherein the medium contains fish.

9. A method as set forth in claim 1 wherein $R^2$ is an unsubstituted alkyl, aryl or aralkyl group of from about five to about fifteen carbon atoms.

10. A method for inhibiting corrosion of ferrous metal surfaces in an aqueous medium [containing] *contacting or to contact* at least one of living Skeletonema costatum or living fish, the method comprising incorporating into the medium a corrosion inhibitor in an amount sufficient to inhibit corrosion of ferrous metal surfaces in the medium, the corrosion inhibitor [having a BOD-28 of at least about 70% in the medium] *having an $EC_{50}$ for Skeletonema costatum of at least about 1 ppm by weight* and comprising the acid/base reaction product of a phosphate ester of the formula

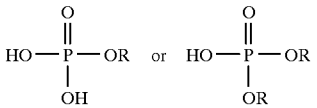

wherein R is $R^2$-$(OCH_2CH_2)_x$, wherein $R^2$ is an alkyl, an aryl, or aralkyl group of from about five to about fifteen carbon atoms, each carbon atom having at least one hydrogen and x is an integer of from one to about ten, and a basic nitrogen compound that is at least water-dispersible.

11. A method as set forth in claim 10 wherein the [agent] *reaction product* is a composition of the formula

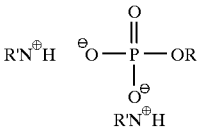

wherein [R and R'N are defined in claim 8 where] R is defined as in claim 8 and where R'N is a basic nitrogen compound.

12. A method as set forth in claim 11 wherein $R^2$ is an unsubstituted alkyl group.

13. A method as set forth in claim 12 wherein the basic nitrogen compound is a compound of the formula

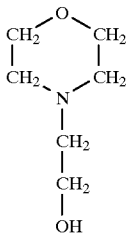

14. A method as set forth in claim 12 wherein x is from about two to about five.

15. A method as set forth in claim 10 wherein the corrosion inhibitor has an $EC_{50}$ for Skeletonema costatum of at least about 1 ppm by weight.

16. A method as set forth in claim [16] *15* wherein the corrosion inhibitor further has a partitioning less than about three, a YL of, at most, about three and a flash point greater than about 56° C.

17. A method as set forth in claim 10 wherein the medium contains fish.

18. A method as set forth in claim 10 wherein $R^2$ is an unsubstituted alkyl, aryl or aralkyl group of from about five to about fifteen carbon atoms.

*19. A method as set forth in claim 1 wherein said medium is free of Skeletonema costatum and living fish when said corrosion inhibitor is incorporated therein and is therafter contacted with Skeletonema costatum or living fish.*

*20. A method as set forth in claim 10 wherein said medium is free of Skeletonema costatum and living fish when said corrosion inhibitor is incorporated therein and is therafter contacted with Skeletonema costatum or living fish.*

*21. A method for inhibiting corrosion of ferrous metal surfaces in an aqueous medium contacting or to contact at least one of living Skeletonema costatum or living fish, the method comprising incorporating into the medium a corrosion inhibitor in an amount sufficient to inhibit corrosion of ferrous metal surfaces in the medium, the corrosion inhibitor comprising a water-soluble agent selected from the group consisting of compositions of the formula*

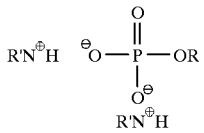

*compositions of the formula*

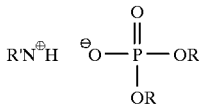

*and mixtures thereof, wherein R is $R^2$-$(OCH_2CH_2)_x$, wherein $R^2$ is an alkyl, aryl, or aralkyl group of from about five to about fifteen carbon atoms, provided that if $R^2$ is an alkyl, it is a straight chain alkyl, each carbon atom having at least one hydrogen and x is an integer of from one to about ten, and R'N is a basic nitrogen compound that is at least water-dispersible.*

*22. A method as set forth in claim 21 wherein the agent is a composition of the formula*

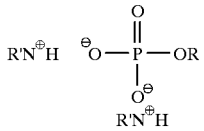

*wherein R and R'N are defined in claim 21.*

*23. A method as set forth in claim 22 wherein $R^2$ is an unsubstituted straight chain alkyl group.*

*24. A method as set forth in claim 23 wherein the basic nitrogen compound is a compound of the formula*

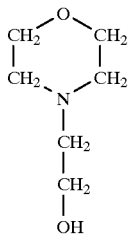

*25. A method as set forth in claim 23 wherein x is from about two to about five.*

*26. A method as set forth in claim 21 wherein said medium is free of Skeletonema costatum and living fish when said corrosion inhibitor is incorporated therein and is therafter contacted with Skeletonema costatum or living fish.*

*27. A method as set forth in claim 1 therein the corrosion inhibitor has a BOD-28 of at least about 70% in the medium.*

*28. A method as set forth in claim 2 wherein the corrosion inhibitor has a BOD-28 of at least about 70% in the medium.*

*29. A method as set forth in claim 3 wherein the corrosion inhibitor has a BOD-28 of at least about 70% in the medium.*

*30. A method as set forth in claim 4 wherein the corrosion inhibitor has a BOD-28 of at least about 70% in the medium.*

*31. A method as set forth in claim 5 wherein the corrosion inhibitor has a BOD-28 of at least about 70% in the medium.*

*32. A method as set forth in claim 7 wherein the corrosion inhibitor has a BOD-28 of at least about 70% in the medium.*

*33. A method as set forth in claim 8 wherein the corrosion inhibitor has a BOD-28 of at least about 70% in the medium.*

*34. A method as set forth in claim 9 wherein the corrosion inhibitor has a BOD-28 of at least about 70% in the medium.*

*35. A method as set forth in claim 10 wherein the corrosion inhibitor has a BOD-28 of at least about 70% in the medium.*

*36. A method as set forth in claim 11 wherein the corrosion inhibitor has a BOD-28 of at least about 70% in the medium.*

*37. A method as set forth in claim 12 wherein the corrosion inhibitor has a BOD-28 of at least about 70% in the medium.*

*38. A method as set forth in claim 13 wherein the corrosion inhibitor has a BOD-28 of at least about 70% in the medium.*

*39. A method as set forth in claim 14 wherein the corrosion inhibitor has a BOD-28 of at least about 70% in the medium.*

*40. A method as set forth in claim 16 wherein the corrosion inhibitor has a BOD-28 of at least about 70% in the medium.*

*41. A method as set forth in claim 17 wherein the corrosion inhibitor has a BOD-28 of at least about 70% in the medium.*

*42. A method as set forth in claim 18 wherein the corrosion inhibitor has a BOD-28 of at least about 70% in the medium.*

* * * * *